United States Patent [19]

Reinhardt et al.

[11] 4,252,621

[45] Feb. 24, 1981

[54] PROCESS OF REGENERATING AN AMMONIACAL ETCHING SOLUTION

[75] Inventors: Hans Reinhardt, Frösunda; Harald D. Ottertun, Mölndal, both of Sweden

[73] Assignee: MX Processer Reinhardt & Co. AB, Mölndal, Sweden

[21] Appl. No.: 28,642

[22] Filed: Apr. 10, 1979

[30] Foreign Application Priority Data

May 2, 1978 [SE] Sweden ............................. 7805037

[51] Int. Cl.³ ............................. C25C 1/12; B08B 7/04; C23G 1/36
[52] U.S. Cl. ............................. 204/106; 423/24; 156/642; 204/108; 75/101 BE
[58] Field of Search ............................. 204/106, 108; 423/24, 423/35, 42, DIG. 14; 156/642, 666; 75/101 BE

[56] References Cited

U.S. PATENT DOCUMENTS

| 3,700,416 | 10/1972 | Lucid | 423/24 |
| 3,971,652 | 6/1976 | Bryson | 423/24 |
| 4,039,405 | 8/1977 | Wong | 423/24 |
| 4,060,447 | 11/1977 | Nelson | 156/642 |
| 4,065,502 | 12/1977 | MacKay | 423/24 |
| 4,083,758 | 4/1978 | Hamby | 204/106 |

FOREIGN PATENT DOCUMENTS 2451006  4/1976  Fed. Rep. of Germany ............ 423/24

Primary Examiner—Brian E. Hearn
Attorney, Agent, or Firm—Burns, Doane, Swecker & Mathis

[57] ABSTRACT

A process is described for regenerating a spent ammoniacal etching solution containing copper values. The process comprises extracting copper from the spent etching solution by means of an organic solution containing a reagent which is capable of selectively extracting copper ions from the spent etching solution. The process also comprises extracting copper from the washing water originating from the etching process.

8 Claims, 1 Drawing Figure

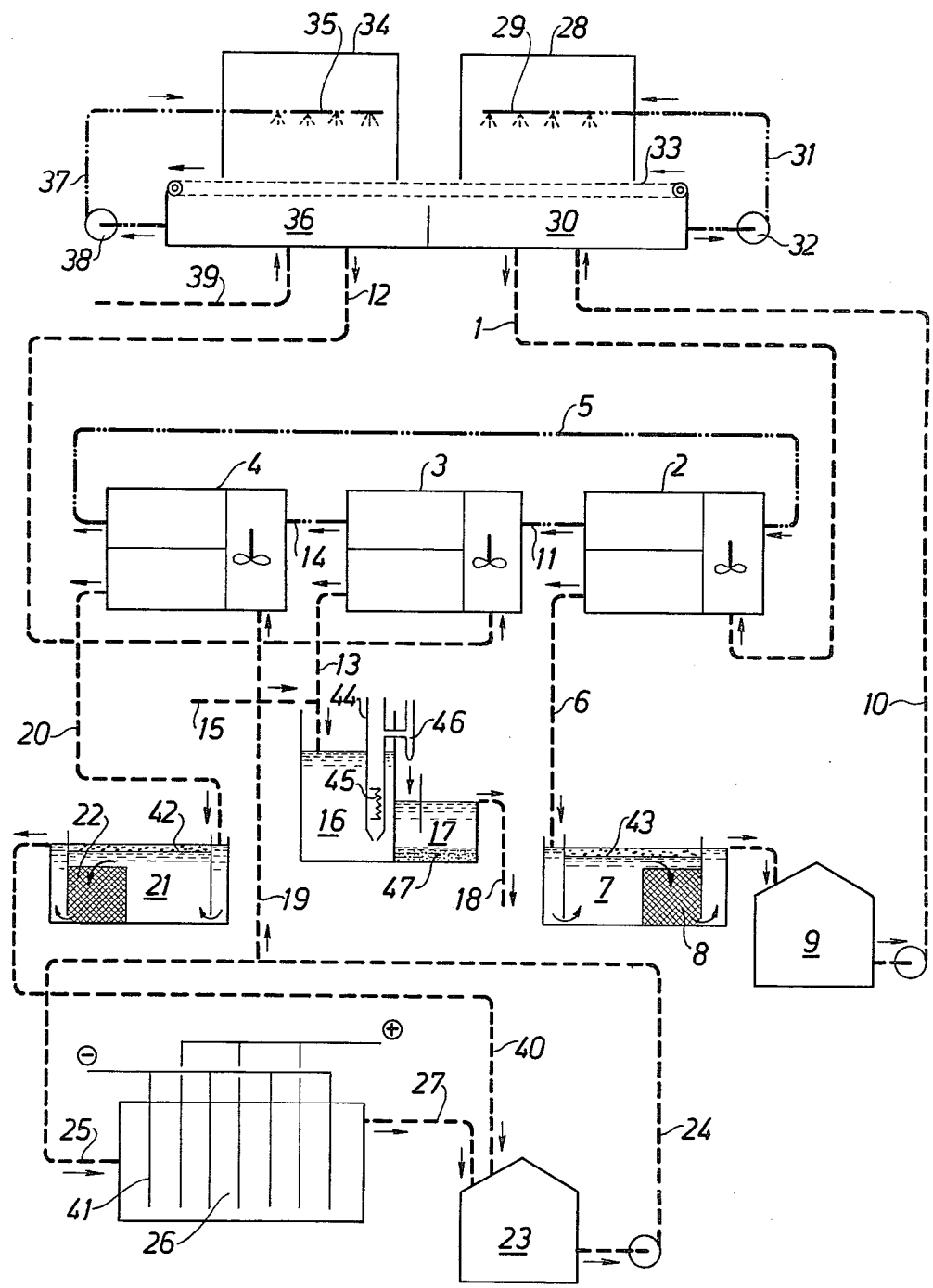

PROCESS OF REGENERATING AN AMMONIACAL ETCHING SOLUTION

The invention relates to a process for regenerating an ammoniacal etching solution from an etching process in which copper objects are first treated with the ammoniacal etching solution and are subsequently washed with water, the etching solution consisting of an aqueous solution containing, in addition to copper, free ammonia, at least one ammonia salt and possibly an oxidizing agent.

The chief object of the invention is to provide a regenerating process which makes it possible to recycle the etching solution a large number of times. Another object of the invention is to recover metallic copper of high purity from the spent etching solution. A still further object is to reclaim the major portion of the copper content in the washing water in a metallic form, and to remove remaining copper and ammonia from the washing water so completely that the latter can be allowed to depart to a municipal sewer.

In the following description, the treatment of spent solutions from the etching of printed electronic circuit cards will be described, although it is clear that the invention can also relate to the regeneration of solutions originating from the etching of other copper articles.

Electronic equipment today is substantially built up from components soldered onto printed electronic circuit cards. The manufacture of these circuit cards has increased very rapidly. Advanced electronics, e.g. for use in computors, requires very complicated circuit cards, and the manufacture of these cards has grown to become a big industry.

A circuit card consists of a basic material, often plastics, on which a thin copper layer has been deposited. On top of the copper layer there is applied a circuit pattern, a so-called lay-out, consisting of a protective plastics film. All the copper not covered by the lay-out is then removed in an etching solution. After having drilled holes for the components, the simplest kind of circuit card is then ready in principle.

Circuit cards are often etched with ammoniacal solutions. These solutions contain free ammonia, one or more ammonium salts, e.g. $NH_4Cl$, $NH_4HCO_3$, and oxidizing agents, (e.g. peroxo salts, chlorites). During etching, the copper is removed from the surface of the circuit card where the copper layer is exposed to the solution. By degrees, the copper content in the etching solution rises to a level where the etching speed is heavily reduced and the solution is no longer serviceable. This upper limit for the copper content is about 150—170 g/l, depending on the composition of the bath. After etching, the cards are washed clean with water.

The invention relates to a method for regenerating the etching solution, in which the copper is removed from the spent solution in a liquid-liquid extraction process. This process, which can be linked directly to the etching process, also allows treatment of the washing water in an environmentally beneficent way. The extracted copper is taken out of the process electrolytically as metallic copper.

A process for regenerating a spent ammoniacal etching solution containing copper values is described in the U.S. Pat. No. 4,083,758 the disclosure of which is herein incorporated by reference. Said known process utilizes a liquid-liquid extraction process for extracting copper from the spent etching solution. The organic solution used for said extraction process contains a reagent which is capable of selectively extracting copper and chloride ions from the etching solution. In order to separate copper ions from chloride ions a stripping process has to be inserted to selectively re-extract the chloride ions from the organic solution. Only after said stripping process can the copper ions be removed from the organic solution in a re-extraction process. The U.S. patent specification is silent as to the treatment of the washing water from the etching process.

The process of the invention comprises providing an organic solution containing a reagent which is capable of selectively extracting copper ions from the spent ammoniacal etching solution, contacting said organic solution with the spent etching solution from the etching step and with the washing water from the washing step, in two separate liquid-liquid extraction steps, so as to extract copper from said spent etching solution and from said washing water, recycling the etching solution from one of said extraction steps to the etching step, contacting the organic solution from the other extraction step with an aqueous solution of sulphuric acid in a re-extraction step so as to re-extract copper from the organic solution to the aqueous sulphuric acid solution, and recycling the organic solution from the re-extraction step to the extraction steps.

BRIEF DESCRIPTION OF THE DRAWING

The accompanying drawing is a schematic outline of an etching process followed by subsequent regeneration of the etching solution.

In the process of the invention the organic solution extracts selectively copper ions, but not chloride ions, from the spent etching solution. Therefore, no extra stripping operation has to be added, for separating copper ions from chloride ions. The invention teaches not only how to regenerate the spent etching solution, but also how to dispose of the washing water from the etching process. The washing water contains a considerable quantity of copper, and the invention makes it possible to deplete the washing water of copper to such an extent that the purified water can be discharged to a municipal sewer without creating pollution problems.

Etching is preferably performed by spraying the ammoniacal solution onto the circuit cards in a screened-off chamber at a temperature of 45°–50° C. The content of the solution of free ammonia and ammonium salt (preferably ammonium chloride) amounts to about 5 M each. For the etching to progress at an optimum rate, it is required that the copper content in the etching solution is about 100 g/l.

The following chemical reaction represents the etching process:

It is evident from the formula that the etching process requires a sufficiently high content of divalent copper. This requires the supply of an oxidizing agent which can oxidize the monovalent copper. Oxygen from the air is used to advantage, the reaction being as follows:

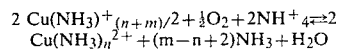

When the total copper content has risen to about 150–170 g/l, the free ammonia content in the etching solution is so low, due to the formation of a complex compound of copper and ammonia, that the etching speed diminishes drastically. Therefore, the content of divalent copper must now be reduced, in order to regain the etching potential of the solution. In accordance with the invention that is accomplished with the help of a liquid-liquid extraction process.

The spent etching solution is mixed with an organic solution containing a reagent which can form with copper a complex compound which can be extracted into the organic solution. We prefer to use a beta-diketone as reagent, and particularly the beta-diketone supplied by General Mills Chemicals Inc. under the trade mark LIX-54. The following reaction takes place during the extraction cycle:

$$Cu(NH_3)_n{}^{2+} + 2\ HA_{(org)} \rightleftharpoons CuA_{2(org)} + (n-2)HN_3 + 2\ NH^+{}_4$$

The letter "A" represents the reagent.

Ammonia is liberated during the reaction, and the etching solution thus regains its etching potential. The extraction yield for copper is adjusted so that an optimum copper content for the etching process is obtained in the raffinate from the extraction step, viz. approximately 100 g/l.

In the same way copper is extracted from the washing water in a second extraction step. This water simultaneously washes the organic extraction solution and removes from it minor drops of the etching solution which have not managed to separate.

The sequence may be reversed, so that the organic solution is contacted first with the washing water and subsequently with the etching solution.

The organic solution, containing extracted copper, is now contacted in a re-extraction step with sulphuric acid, to re-extract the copper according to the following reaction:

$$CuA_{2(org)} + H_2SO_4 \rightleftharpoons 2\ HA_{(org)} + CuSO_4$$

The organic solution is now recycled to the extraction steps for renewed extraction of copper. The sulphuric acid is electrolyzed to recover metallic copper, the following gross reaction taking place:

$$CuSO_4 + H_2O \rightleftharpoons Cu^\circ + \tfrac{1}{2}O_2 + H_2SO_4$$

Sulphuric acid is thus generated in the electrolytic process, said acid being recycled to the re-extraction step.

For the extraction and re-extraction steps we prefer to use apparatuses of the mixer-settler type, containing a mixing chamber with an agitator for mixing the aqueous solution with the organic solution, and a chamber in which the two solutions are allowed to separate because of their different densities.

EXAMPLE

An example of an etching process combined with the regenerating process of the invention will be described with reference to the apparatus illustrated on the drawing. The example was carried out on a pilot plant scale, but the process has been successfully tested on an industrial scale.

Articles to be etched were transported on a conveyor 33 through an etching chamber 28 and subsequently through a washing chamber 34. Etching solution was pumped by a pump 32 from a sump 30 via a conduit 31 to a perforated tube 29 inside the etching chamber 28, and was sprayed over the articles to be etched. Water was pumped by a pump 38 from a sump 36 via a conduit 37 to a perforated tube 35 inside the washing chamber 34, and was sprayed over the articles to be washed. Fresh water was added through a conduit 39. The spent etching solution had the following composition:

|  | g/l |
| --- | --- |
| Cu | 160 |
| NH$_3$ (free) | 85 |
| NH$_4$Cl | 270 |

The spent etching solution was pumped through a conduit 1 to a mixer-settler assembly containing a first extraction step 2, a second extraction step 3 and a re-extraction step 4. The flow of spent etching solution was 0.4 l/min.

In the first extraction step, the spent etching solution was contacted with a kerosene solution, added through a conduit 5, containing 50 percent by volume of the beta-diketone known under the trade name of LIX-54. The organic solution flowed at a rate of 1.2 l/min. Copper was here extracted from the spent etching solution so that its copper content dropped to 97 g/l. The raffinate was caused to pass through a conduit 6 to a flotation step 7 in which small organic drops separated from the raffinate to form a layer 43 on the surface. The raffinate was then taken through a filter 8 containing active carbon before being stored in a tank 9.

The regenerated solution was recycled through a conduit 10 to the etching process, which could thus be driven as before, and the copper content of the etching solution could once again rise to about 160 g/l before it had to be replaced with regenerated solution.

The organic extract solution, leaving the mixer-settler 2 through a conduit 11, contained 20.5 g/l copper. It was contacted in the second extraction step 3 with the washing water coming from the sump 36 through a conduit 12. The washing water contained copper, ammonia and ammonium chloride to an amount of 1/10 of the contents of the etching solution. Consequently, the content of copper of the washing water was 16 g/l. The washing water flowed at a rate of 0.08 l/min.

The organic solution left the mixer-settler 3 through a conduit 14. Its copper content was 21 g/l. The washing water left the mixer-settler 3 through a conduit 13. Its copper content was 0.10 g/l. Sodium hydroxide was added to the washing water through a conduit 15, to produce in the washing water a sodium hydroxide content of 20 g/l. Said alkalized water flowed into a container 16, containing a vertical tube 44, The tube 44 had open upper and lower ends, and contained a heating element 45 for bringing the water in the tube to boil. The tube 44 was supplied with a branched tube 46 extending into a sedimentation container 17. Ammonia was driven off from the boiling water in the tube 44, resulting in cooper hydroxide being precipitated. Approximately 10–15% of the water boiled off together with the ammonia. The boiling resulted in a raised water level in the tube 44, resulting in the water flowing over through the branched tube 46 into the sedimentation container 17. The precipitated copper hydroxide formed a layer 47 on the bottom of the sedimentation container 17. The copper hydroxide may be dissolved in the sulphuric acid solution to be electrolyzed. The water left the sedimentation container 17 through a conduit 18 and was discharged into a sewer. The flow of this water amounted to 0.04 l/min.

The organic solution arriving to the mixer-settler 4 through the conduit 14 was contacted with a sulphuric acid solution supplied through a conduit 19 and containing 20 g/l copper and 160 g/l free sulphuric acid. The flow of the acidic solution was 0.8 l/min. Copper was re-extracted into the sulphuric acid solution. The acidic solution departed through a conduit 20. It contained 47 g/l copper.

The organic solution from the re-extraction process contained 1.1 g/l copper. It was recycled through the conduit 5 to the extraction of copper.

The sulphuric acid solution was taken through the conduit 20 to a flotation tank 21 containing an active carbon filter 22. Drops of organic solution separated from the aqueous liquid forming a surface layer 42. The last traces of organic liquid were removed in the filter 22. The solution flowed through a conduit 40 to a tank 23, from which it was pumped through conduits 24, 25 to an electrolytic cell 26, where copper was deposited on titanium cathodes 41. The current density was 1.5 ampere/dm$^2$ and the cell voltage was 2.0 V. The copper content in the acid solution was reduced to 20 g/l by the electrolysis. The electrolyte 27 was recycled to the tank 23. Part of the solution pumped through the conduit 24 was recycled through a conduit 19 to the re-extraction step 4.

In the illustrated apparatus the organic solution from the re-extraction step 4 is used for extracting copper first from the spent etching solution and subsequently from the washing water. Said sequence may be reversed by passing the organic solution from the re-extraction step 4 first to the mixer-settler 3, to extract copper from the washing water, and subsequently to the mixer-settler 2, to extract copper from the spent etching solution. The loaded organic solution from the mixer-settler 2 is recycled to the re-extraction step 4.

We claim:

1. A process of regenerating a spent ammoniacal etching solution originating from an etching process in which copper objects are etched with said etching solution and are subsequently washed with water, said etching solution containing, in addition to copper, free ammonia, at least one ammonium salt, and, if desired, an oxidizing agent, comprising (1) providing an organic solution containing a reagent which is capable of selectively extracting copper ions from the spent ammoniacal etching solution, (2) in separate consecutive liquid-liquid extraction steps comprising (a) contacting said organic solution with the spent etching solution originating from the etching process to extract copper from the spent etching solution in a manner sufficient to yield separate solutions of regenerated etching solution and organic solution, and (b) contacting said organic solution with said wash water originating from said etching process to extract copper from said wash water in a manner sufficient to yield separate solutions of copper-depleted wash water and organic solution, wherein the order of steps (a) and (b) can be (b) following (a) and (a) following (b) with the proviso that the organic solution derived from the first in time of said consecutive steps (a) and (b) is employed as the source of the organic solution employed in the second in time of said consecutive steps, (3) recycling the regenerated etching solution from step 2(a) to the etching step in said etching process, (4) contacting the organic solution derived from the second in time of said separate consecutive liquid-liquid extraction steps with an aqueous solution of sulphuric acid in a re-extraction step so as to re-extract copper from the organic solution to the aqueous sulphuric acid solution, and (5) recycling the organic solution from the re-extraction step to the extraction steps.

2. A process as claimed in claim 1, in which step 2(a) precedes step 2(b).

3. A process as claimed in claim 1, in which step 2(b) precedes step 2(a).

4. A process as claimed in claim 1, comprising recovering copper electrolytically from the copper-containing aqueous solution of sulphuric acid and recycling the electrolyte to the re-extraction step.

5. A process as claimed in claim 4, comprising passing the aqueous solution of sulphuric acid going to the electrolysis through a bed of active carbon, to remove any organic solution which may accompany the aqueous solution.

6. A process as claimed in claim 1, comprising passing the regenerated etching solution going back to the etching step through a bed of active carbon, to remove any organic solution which may accompany the etching solution.

7. A process as claimed in claim 1, comprising adding alkali to the washing water departing from the extraction step, boiling off free ammonia from said alkalized water, and separating copper hydroxide precipitating upon boiling off ammonia.

8. A process as claimed in claim 1, wherein the reagent is a beta-diketone.

* * * * *